Patented Aug. 31, 1948

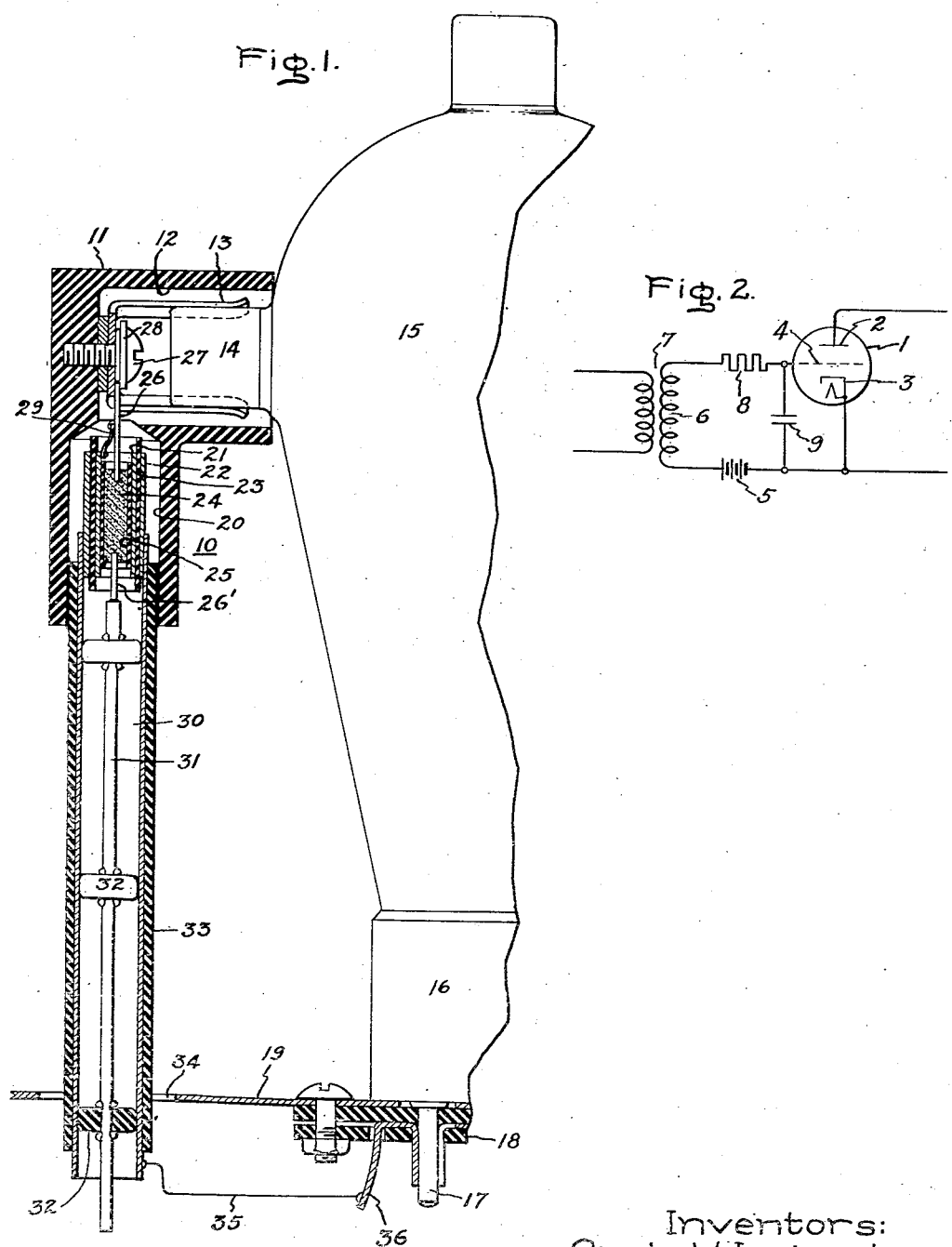

2,448,378

UNITED STATES PATENT OFFICE 2,448,378

GRID-TO-CATHODE CAPACITOR CONSTRUCTION

Orrin W. Livingston and Elmo E. Moyer, Scotia, N. Y., assignors to General Electric Company, a corporation of New York Application March 28, 1946, Serial No. 657,877

4 Claims. (Cl. 250—16)

Our invention relates to electric circuit devices and more particularly to an improved connector device including the elements of a transient suppressing circuit for an electric discharge device.

In circuits utilizing controlled electric discharge devices, particularly of the gaseous discharge type, it has been common practice to connect a transient suppressing capacitor between the grid and cathode terminals with the grid connection electrically nearer the grid than the current limiting resistor. The resistor and capacitor have been wired in the circuit in the same manner as other circuit components, with the result that in some cases there is a considerable length of exposed grid lead between the terminal of the capacitor and the grid terminal. Since the capacitor functions to by-pass steep wave front voltages, it is apparent that it is desirable to place it as close to the grid of the device as possible. It is also desirable to minimize the transient voltages that are induced in the grid circuit by the operation of other equipment with which the discharge device is associated.

In accordance with an important aspect of our invention, we provide an improved grid terminal connector or grid cap in which the current limiting resistor and transient suppressing capacitor are located. One end of the resistance and capacitor are adjacent the grid terminal and connected with it by a lead of negligible length. The other terminal of the grid resistor is connected with a conductor supported concentrically within a hollow conductor connected with the other terminal of the capacitor, in this way shielding the grid supply conductor from transient voltages.

It is an object of our invention to provide a new and improved grid circuit connection device for electric discharge devices.

It is another object of our invention to provide a new and improved connector for electric discharge devices which incorporates the elements of a transient suppressing circuit.

It is still another object of our invention to provide a new and improved circuit device for electric discharge devices which provides for the suppression of transient voltages in the grid circuit and the shielding of the grid signal conductor.

Further objects and advantages of our invention will become apparent as the following description proceeds, reference being had to the accompanying drawing in which Fig. 1 is an elevational view, in section, of a device embodying our invention and applied to the grid and cathode terminals of an electric discharge device, and Fig. 2 is a schematic representation of a circuit of the type to which our invention is particularly applicable.

Referring now to the drawing, I have shown in Fig. 2 what may be considered a conventional grid-cathode circuit for electric discharge devices of the gas-filled type. The device as illustrated includes an envelope 1 having a gaseous filling, such as mercury vapor, and three electrodes including an anode 2, a cathode 3 and a control grid 4. The voltage of the control member with respect to the cathode is determined by a source of bias potential 5 which as illustrated comprises a battery and a secondary winding 6 of a grid transformer 7. The battery 5 and secondary winding 6 are connected between the grid and cathode in a series circuit including, in addition, a current limiting resistor 8. A transient suppression capacitor 9 is connected between the grid terminal 8 and the cathode of the device. It will be apparent that as the size of the capacitor 9 increases, its effectiveness in eliminating transients also increases. However, at the same time the increase in capacitance decreases the rate of response of the control member to signal voltages so that it is necessary to balance these factors in selecting the capacitor 9.

Referring now to Fig. 1, I have shown our invention embodied in a connector 10 including a body of insulating material 11 and recessed, as at 12, to receive a spring terminal conductor 13 which is adapted to engage the grid terminal 14 of an electric discharge device 15. The device 15 may be of the gaseous discharge type and includes the usual base 16 provided with terminal prongs 17 which are received within a socket 18 supported from a panel or chassis 19. Only one terminal prong 17 of the device is shown in the drawing and it will be assumed that this terminal is connected with the cathode of the device 15.

As illustrated in the drawing, the body of insulating material 11 is angular in form and is provided with a second recess 20 which houses circuit elements corresponding to the current limiting resistor 8 and transient suppressing capacitor 9 of Fig. 2. As shown in Fig. 1, the capacitor is of cylindrical cross section and includes inner and outer cylindrical conducting elements or members 21 and 22 separated by a layer of dielectric illustrated at 23. It will be understood that the capacitor may be formed in accordance with any of the methods well known in the art, and that the conducting members 21 and 22 may be provided by sheets of foil separated by a layer of dielectric. The use of the word "cylindrical" in the specification and claims is intended to cover such a construction in which the actual conductor may comprise a plurality of layers of foil.

The current limiting resistor as illustrated is housed within the inner conductor of the capacitor and in insulated relation with respect thereto. The resistor includes a body of resistance material 24 and an outer covering of insulating material 25 which engages the inner wall of the inner conducting member 21 of the capacitor. The upper terminal of the resistor is provided by a conductor 26 which is connected with the spring terminal 13 by a bolt 27, and which engages the insulating body 11. The bolt 27 also secures the terminal 13 within the insulating body and a suitable washer 28 may be provided for engaging the conductor 26. The inner conducting member 21 of the capacitor is connected with the conductor 26 by a short conductor 29. It will be apparent that the distance between the common terminal of the resistor 24, the capacitor and the actual grid of the electric discharge device is extremely short. In addition, the arrangement of our invention provides for shielding the input or grid conductor. As illustrated in the drawing, the other terminal of the resistor 25 is provided by a conductor 26; and this terminal together with the outer conductor 22 of the capacitor provide concentric terminals for connection, respectively, with the grid signal source which may be a grid transformer, and with the cathode of the device. As illustrated, an outer hollow cylindrical conductor 30 which may be either flexible or rigid is connected with the outer conductor 22 of the capacitor and provides a shield and support for a central conductor 31 connected with the terminal 26' of the resistor. As illustrated, the inner conductor is positioned by a plurality of insulating disks 32. An outer cylinder of insulation 33 may be provided about the conductor 30, if desired. The conductor 30 may be soldered or otherwise bonded to the outer conductor of the capacitor.

As illustrated in the drawing, the lower end of the concentric cable includes conductors 30 and 31 extending through an opening 34 in the chassis 19. The outer conductor is connected by a conductor 35 to the terminal 36 of the socket 18 which engages the cathode terminal prong 17 of the discharge device. It will be apparent that the lower end of the inner conductor 31 is in use connected to the source of signal voltage.

It will be apparent from the foregoing description that our invention provides a grid connector which insures that the grid capacitor and resistanace are located close to the grid terminal of the device, and further shields the grid conductor in the region above the chassis so that the transient voltages induced in the grid circuit are reduced to a minimum. In this way the effectiveness of the transient suppressing circuit is increased and at the same time the cost of the transient suppressing circuit and the space required for it are reduced.

While we have shown and described a particular embodiment of our invention, it will be apparent to those skilled in the art that changes and modifications may be made without departing from the features of our invention, and we, therefore, aim in the appended claims to cover all such changes and modifications as fall within the true scope and spirit of our invention.

What we claim as new and desire to secure by Letters Patent of the United States is:

1. A connector including a body of insulating material, a terminal conductor adapted to engage a grid terminal of an electric discharge device and supported within a recess in said body of insulating material, said body having a second recess formed therein, a cylindrical capacitor including inner and outer conducting cylinders positioned in said second recess, a resistance element having a pair of terminals, means within said body of insulating material connecting one terminal of said resistor and the inner cylinder of said capacitor with said terminal conductor, the other terminal of said resistor and the outer cylinder of said capacitor providing concentric terminals for connection with external circuits.

2. A connector including a body of insulating material, a terminal conductor adapted to engage the grid terminal of an electric discharge device and supported within a recess in said body of insulating material, and a capacitor including a pair of conducting elements positioned within said body with one of said elements connected with said terminal conductor.

3. A connector including a body of insulating material, a terminal conductor adapted to engage the grid terminal of an electric discharge device and supported in a recess in said body of insulating material, a capacitor including a pair of concentrically arranged cylindrical conducting elements positioned within said body, and means connecting the inner one of said members with said terminal conductor.

4. A connector including a body of insulating material, a terminal conductor adapted to engage the grid terminal of an electric discharge device and supported within a recess in said body of insulating material, a capacitor including a pair of concentrically arranged cylindrical conducting members, a resistor element including a pair of terminals, said resistor being positioned within the inner one of said conducting members, and means connecting one terminal of said resistor, the inner conductor of said capacitor and said terminal conductor together, the other terminal of said resistor and the outer conductor of said capacitor providing concentric terminals for external circuit connections.

ORRIN W. LIVINGSTON.
ELMO E. MOYER.

REFERENCES CITED

The following references are of record in the file of this patent:

UNITED STATES PATENTS

| Number | Name | Date |
|---|---|---|
| 1,688,622 | Johnson | Oct. 23, 1928 |
| 2,163,412 | Schneider | June 20, 1939 |

FOREIGN PATENTS

| Number | Country | Date |
|---|---|---|
| 422,455 | Great Britain | Jan. 11, 1935 |